Patented Feb 8, 1944

2,340,866

UNITED STATES PATENT OFFICE 2,340,866

POLYVINYL ALCOHOL COMPOSITION

Charles Dangelmajer, Nutley, N. J., assignor to Resistoflex Corporation, Belleville, N. J., a corporation of New York No Drawing. Application July 18, 1940,
Serial No. 346,150

15 Claims. (Cl. 260—8)

This invention relates to the making of plasticized compositions of polyvinyl alcohol and its partial derivatives and to the working of such compositions to form flexible articles therefrom.

Polyvinyl alcohol is a water-soluble solid obtained by the hydrolysis or saponification of polyvinyl esters. It is commercially produced by saponification of polyvinyl acetate. If the saponification is not carried to completion, partial derivatives of polyvinyl alcohol result, in which more or less of the hydroxyl groups of polyvinyl alcohol are replaced by ester radicals. The degree of saponification may be determined by standard procedures and is indicated by a "saponification number." Partial derivatives of polyvinyl alcohol having a saponification number of about 300 or less show the essential characteristics of polyvinyl alcohol, particularly solubility in water as distinguished from polyvinyl esters which are soluble only in organic solvents, and the term "polyvinyl alcohol" is customarily so used as to include such water-soluble partial derivatives as well as the completely hydrolyzed product.

I have found that these partial derivatives differ from one another and from pure polyvinyl alcohol in certain important respects which will hereinafter be explained.

In the making of flexible articles such as tubing, hose, gaskets, washers, films, sheets, etc., I have found that the use of polyvinyl alcohol of low saponification number (0 to about 40) gives a harder product and that polyvinyl alcohol of high saponification number (about 150 to about 300) gives a softer product than is obtained with a saponification number of intermediate range, assuming of course that the same quality and quantity of plasticizers are used. It will readily be appreciated that this provides an element of control through selection of the proper partial derivative which is very desirable in the manufacturing of goods to met different needs. However, in attempting to combine partial derivatives of polyvinyl alcohol of essentially different saponification numbers to secure a blend having the desired average saponification number, I have discovered that there exists an incompatibility between the different partial derivatives, under the manufacturing conditions to which they are subjected, which makees it difficult or even impossible to work them in accordance with known procedures.

I have discovered that this incompatibility is due to the fact that the partial derivatives of low saponification number behave in the usual manner and are more soluble in hot than in cold water while those of high saponification number are more soluble in cold water than they are in hot water. I have further discovered that solutions of the derivatives of low saponification number decrease in viscosity with increase in temperature while those of high saponification number increase in viscosity with increase in temperature. The result is that if one attempts, for example, to extrude a composition comprising a blend of partial derivatives of substantially different saponification numbers, with the necessary heat and pressure, the materials separate with loss of homogeneity and lump formation, the viscosity varies in an unpredictable manner due to the opposite changes of viscosity of the components, and extrusion may become practically impossible.

One important object of the invention, therefore, is to eliminate these difficulties and to make it possible to work compositions comprising a blend or mixture of partial derivatives of polyvinyl alcohol of substantially different saponification number. The ability to utilize such blends is of great economic importance because in the manufacture of the partial derivatives of polyvinyl alcohol a number of variable factors make it difficult to control the degree of saponification, which varies from batch to batch. The cost of obtaining raw material of a constant saponification number is therefore economically prohibitive. If the saponification number of the raw material is variable, it is impossible to standardize manufacturing procedures. But if the desired average saponification number can be obtained by blending, manufacturing can be standardized on an economical basis.

Another problem arises in conjunction with admixtures of polyvinyl alcohol and agents utilized to increase the flexibility of the ultimate product. Such agents are usually polyhydric alcohols such as glycerine and various glycols. For example, the composition most generally employed comprises polyvinyl alcohol and glycerine. This plasticizing effect is not permanent, however, due to lack of compatibility of the ingredients which causes the glycerine to exude with resultant gradual loss of flexibility. Such exudation is especially noticeable in humid atmosphere in which the composition may be observed to "sweat." This exudation occurs whether or not the composition also contains water.

A second object of the invention, therefore, is to promote the compatibility of polyvinyl alcohols with polyhydric alcohols or other plasticizers, preventing exudation and increasing the duration of plasticity.

A further problem arises in the combining of polyvinyl alcohols with other ingredients in the nature of carbohydrates such as starch, tapioca flour, and pentosans such as those contained in wood flour protein such as glue and the like, and other colloidal substances. Such added ingredients are not mere inert fillers but become part of a homogeneous composition having advantageous properties. I have found, however, that their compatibility with polyvinyl alcohol in the compositions heretofore suggested is not satisfactory and that such compositions on standing become opaque, indicating a separation of the ingredients, and that on bending articles made of such compositions they show the bending lines.

A third object of the invention, therefore, is to promote the compatibility of polyvinyl alcohols with other soluble and colloidal substances including carbohydrates and proteins so that admixtures thereof will remain homogeneous and stable with aging and mechanical manipulation.

Another object is to reduce the critical effect of the water content on the viscosity of polyvinyl alcohol compositions containing water, so as to facilitate their extrusion and enable the amount of water to be reduced while maintaining extrusion rates.

A further object is to improve the duration of flexibility of polyvinyl alcohol compositions through a greater range of temperatures.

My invention resides in the discovery that all of the foregoing objects and others can be attained and homogeneous compositions formed of partial derivatives of polyvinyl alcohol of substantially different saponification numbers, of polyvinyl alcohols and plasticizing materials which are not otherwise permanently compatible therewith, and of polyvinyl alcohols with other soluble and colloid forming materials, by the incorporation, as blending agents, in such compositions of appropriate amounts of one or more substantially non-volatile water-soluble amides. By "non-volatile" is meant a volatility not substantially greater than that of water.

I have successfully used as blending agents for the purposes stated such amides as formamide, acetamide and urea (carbamide) and such derivatives thereof as ethanol formamide and ethanol acetamide.

For a better understanding of how the invention may be practiced and the advantages thereof, reference may be had to the following examples, which are given for the purposes of illustration only and are not to be taken as limitations.

*Example I*

Three equal portions of polyvinyl alcohol partial derivatives having substantially different saponification numbers were thoroughly mixed together. This mixture was then used in the following compositions (parts by weight):

|  | A | B |
|---|---|---|
| Polyvinyl alcohols | 100 | 100 |
| Glycerine | 35 | 35 |
| Water | 50 | 50 |
| Formamide |  | 5 |

These compositions were then worked in the same manner, according to the process described in U. S. Patent No. 2,177,612, by first passing the mix through rolls to form a web which was then fed to an extruder for making tubing. Composition A gave a very uneven tubing showing lump formation due to separation of the polyvinyl alcohols. Extrusion was at a very slow rate due to excessive viscosity. Composition B, which included 5% formamide, based on the polyvinyl alcohol, gave uniform homogeneous tubing, showing complete compatibility of the different partial derivatives of polyvinyl alcohol, and at a greatly increased rate of extrusion. When allowed to stand in humid atmosphere the tubing of composition A exuded while that made of composition B showed no tendency to exude or sweat, which further indicates that the formamide produced compatibility of the glycerine with the polyvinyl alcohol.

*Example II*

Polyvinyl alcohol of medium average saponification number was used as follows in compositions containing no water:

|  | A | B |
|---|---|---|
| Polyvinyl alcohol | 100 | 100 |
| Glycerine | 40 | 37 |
| Formamide |  | 15 |

After preliminary treatment on rolls, as in Example I, the compositions were molded at 115° C. under 630 lbs. per square inch pressure. In air of 50-60% relative humidity, composition A exuded very badly. Composition B remained dry, showing that the addition of the formamide rendered the polyvinyl alcohol and glycerine compatible. Composition B was also used for the extrusion of tubing with very satisfactory results as to uniformity and rate of extrusion.

*Example III*

The same polyvinyl alcohol used in Example II was combined with carbohydrate and protein as follows:

|  | A | B |
|---|---|---|
| Polyvinyl alcohol | 40 | 40 |
| Tapioca flour | 20 | 20 |
| 50% aqueous glue solution | 10 | 10 |
| Glycerine | 30 | 10 |
| Formamide |  | 25 |

Composition A, immediately after molding, was clear but after standing for a few hours it became opaque. Subjected to bending, the clear material became opaque along the bending lines. Composition B, fabricated in the same way, remained clear during storage and when bent, indicating that the addition of formamide rendered the flour and glue compatible with the polyvinyl alcohol. In this composition the flour and glue are not merely fillers but become homogeneous with the other ingredients, improving the mechanical strength and other properties of the product.

*Example IV*

With regard to extrusion, the use of the blending agents of my invention is of particular importance, as illustrated by the following: a mix of polyvinyl alcohol of medium average saponification number was made in the proportions of 100 g. polyvinyl alcohol, 35 g. glycerine and 50 g. water. This was divided into three batches which were processed according to Patent No. 2,177,612.

One batch was treated on rolls until the water content had been reduced by evaporation to 58% and another until it was reduced to 68% of the initial water content. The batch containing the least water when extruded was very viscous, extruded very slowly and produced a lumpy article. The batch with the most water had too low a viscosity and the article lost its shape immediately after leaving the extruder. The third batch which was given such preliminary treatment as to have an intermediate water content produced very good results on extrusion. This is an illustration of what I term the "water-sensitivity" of a composition of polyvinyl alcohol-glycerine-water. The permissible range of variation is less than 10%. The same phenomenon exists when other polyhydric alcohols are used in place of glycerine. A mix made exactly as above but with the addition of 7% of formamide, based on the polyvinyl alcohol, and when worked in the same way, gave very good results on extrusion with a water content which varied all the way from 50% to 75% of the water initially added to the composition. Thus the permissible variation of water content was increased by the use of formamide as a blending agent from something less than 10% to 25% or over. This is an advantage of great practical significance in manufacturing as it obviates the necessity of close control of evaporation from the material fed to the extruder and eliminates a great amount of waste.

The blending agents described above may be used in conjunction with polyhydric alcohol plasticizers other than glycerine as indicated by the following:

*Example V*

| | |
|---|---|
| Polyvinyl alcohol | 100 |
| Ethylene glycol | 15 |
| Monoethanol amine phthalate | 15 |
| Acetamide | 15 |
| Water | 45 |

It is to be understood that the blending agents need not be used singly but two or more may be used in the same composition in various combinations with one another.

In general, the blending agents herein described may be added to the polyvinyl alcohol compositions in amounts up to about 50%, based on the polyvinyl alcohol. I am of course aware that the use of formamide or urea as a plasticizer for a composition of a polyvinyl alcohol and water has been suggested, but so far as I am aware no one has heretofore discovered the property of these amides of rendering compatible compositions containing different polyvinyl alcohol partial derivatives of different saponification number, or compositions of a single or different polyvinyl alcohols with other plasticizers or with colloidal substances such as carbohydrates and proteins.

It is to be understood that the foregoing specific examples are merely illustrative and the invention is not to be considered as limited thereto, but may be practiced with various modifications within the purview of the appended claims.

What is claimed is.

1. A flexible homogeneous plasticized polyvinyl alcohol composition capable of being formed with heat and pressure without loss of homogeneity and substantially free from exudation comprising polyvinyl alcohol, polyhydric alcohol plasticizer and a blending agent selected from the group consisting of formamide, acetamide, urea, ethanol formamide and ethanol acetamide.

2. A flexible homogeneous plasticized polyvinyl alcohol composition capable of being formed with heat and pressure without loss of homogeneity and substantially free from exudation comprising polyvinyl alcohol, water, polyhydric alcohol plasticizer and a blending agent selected from the group consisting of formamide, acetamide, urea, ethanol formamide and ethanol acetamide.

3. A flexible homogeneous plasticized polyvinyl alcohol composition capable of being formed with heat and pressure without loss of homogeneity and substantially free from exudation comprising polyvinyl alcohol, a cabohydrate, polyhydric alcohol plasticizer, and a blending agent selected from the group consisting of formamide, acetamide, urea, ethanol formamide and ethanol acetamide.

4. A flexible homogeneous plasticized polyvinyl alcohol composition capable of being formed with heat and pressure without loss of homogeneity and substantially free from exudation comprising polyvinyl alcohol, a protein, polyhydric alcohol plasticizer and a blending agent selected from the group consisting of formamide, acetamide, urea, ethanol formamide and ethanol acetamide.

5. A flexible homogeneous plasticized polyvinyl alcohol composition capable of being formed with heat and pressure without loss of homogeneity and substantially free from exudation comprising polyvinyl alcohol, a polyvinyl alcohol partial derivative of substantially different water-solubility characteristics, water, polyhydric alcohol plasticizer, and a blending agent selected from the group consisting of formamide, acetamide, urea, ethanol formamide and ethanol acetamide.

6. A flexible homogeneous plasticized polyvinyl alcohol composition capable of being formed with heat and pressure without loss of homogeneity and substantially free from exudation comprising polyvinyl alcohol, polyhydric alcohol plasticizer, and formamide.

7. A flexible homogeneous plasticized polyvinyl alcohol composition capable of being formed with heat and pressure without loss of homogeneity and substantially free from exudation comprising polyvinyl alcohol, water, polyhydric alcohol plasticizer, and formamide.

8. A flexible homogeneous plasticized polyvinyl alcohol composition capable of being formed with heat and pressure without loss of homogeneity and substantially free from exudation comprising polyvinyl alcohol, water, a carbohydrate, polyhydric alcohol plasticizer for the polyvinyl alcohol, and formamide.

9. A flexible homogeneous plasticized polyvinyl alcohol composition capable of being formed with heat and pressure without loss of homogeneity and substantially free from exudation comprising polyvinyl alcohol, water, a protein, polyhydric alcohol plasticizer for the polyvinyl alcohol, and formamide.

10. A flexible homogeneous plasticized polyvinyl alcohol composition capable of being formed with heat and pressure without loss of homogeneity and substantially free from exudation comprising polyvinyl alcohol, glycerine, and formamide.

11. A flexible homogeneous plasticized polyvinyl alcohol composition capable of being formed with heat and pressure without loss of homogeneity and substantially free from exudation comprising polyvinyl alcohol, water, glycerine, and formamide.

12. A flexible homogeneous plasticized polyvinyl alcohol composition capable of being formed with heat and pressure without loss of homogeneity and substantially free from exudation comprising polyvinyl alcohol, a carbohydrate, polyhydric alcohol plasticizer, and formamide.

13. A flexible homogeneous plasticized polyvinyl alcohol composition capable of being formed with heat and pressure without loss of homogeneity and substantially free from exudation comprising polyvinyl alcohol, a protein, polyhydric alcohol plasticizer, and formamide.

14. A flexible homogeneous plasticized polyvinyl alcohol composition capable of being formed with heat and pressure without loss of homogeneity and substantially free from exudation comprising polyvinyl alcohol, water, polyhydric alcohol plasticizer, and acetamide.

15. A flexible homogeneous plasticized polyvinyl alcohol composition capable of being formed with heat and pressure without loss of homogeneity and substantially free from exudation comprising polyvinyl alcohol, water, polyhydric alcohol plasticizer, and ethanol acetamide.

CHARLES DANGELMAJER.